United States Patent
Brandt et al.

(10) Patent No.: US 8,971,668 B2
(45) Date of Patent: Mar. 3, 2015

(54) COVARIANCE BASED COLOR CHARACTERISTICS OF IMAGES

(71) Applicant: Adobe Systems Incorporated, Santa Jose, CA (US)

(72) Inventors: Jonathan W. Brandt, Santa Cruz, CA (US); Nico A. Becherer, Hamburg (DE); Sven Duwenhorst, Hamburg (DE)

(73) Assignee: Adobe Systems Incorporated, San Jose, CA (US)

( * ) Notice: Subject to any disclaimer, the term of this patent is extended or adjusted under 35 U.S.C. 154(b) by 193 days.

(21) Appl. No.: 13/778,938

(22) Filed: Feb. 27, 2013

(65) Prior Publication Data

US 2014/0244669 A1    Aug. 28, 2014

(51) Int. Cl.
*G06K 9/60* (2006.01)
*G06F 17/30* (2006.01)

(52) U.S. Cl.
CPC .............................. *G06F 17/3025* (2013.01)
USPC ........... 382/305; 382/162; 382/103; 382/190; 382/159; 382/115

(58) Field of Classification Search
CPC .......... G06F 17/3025; G06F 17/30802; G06K 9/4652; G06K 9/4642; G06K 9/6212; G06K 9/00; G06K 9/00288
USPC ......... 382/103, 159, 115, 145, 162, 165, 190, 382/236, 305; 707/754; 706/52
See application file for complete search history.

(56) References Cited

U.S. PATENT DOCUMENTS

| | | | | |
|---|---|---|---|---|
| 2004/0197013 | A1* | 10/2004 | Kamei | 382/118 |
| 2009/0297046 | A1* | 12/2009 | Zhao et al. | 382/224 |
| 2014/0079297 | A1* | 3/2014 | Tadayon et al. | 382/118 |

\* cited by examiner

*Primary Examiner* — Ali Bayat
(74) *Attorney, Agent, or Firm* — Wolfe-SBMC

(57) ABSTRACT

Each of multiple images is analyzed to determine how the colors of the pixels of the image are distributed throughout the color space of the image. Different covariance based characteristics of the image are determined that identify a direction, as well as magnitude in each direction, of the distribution of colors of the image pixels. These different covariance based characteristics that are determined for an image can be saved as associated with the image, allowing the characteristics to be accessed and used as a basis for searching the images to identify particular types of images. These different covariance based characteristics can also be used to order the images identified by a search.

24 Claims, 9 Drawing Sheets

COVARIANCE BASED COLOR CHARACTERISTICS OF IMAGES

BACKGROUND

Users commonly have access to many different digital images, including digital images that users have taken or created themselves as well as digital images taken or created by others. Situations can arise where users want to find digital images with certain properties in color appearance, such as images that are grayscale images. However, given the large number of digital images available to users, it can be difficult for users to locate the images that have the desired properties in color appearance. This difficulty can increase user frustration and reduce the user friendliness of services that make images available to users.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, a request to search multiple images is received, the request being associated with particular search criteria. Covariance based characteristics of each of the multiple images are obtained, the covariance based characteristics of an image identifying one or both of a direction and a magnitude, in a color space of the image, of a distribution of color values of pixels of the image. Based on both the covariance based characteristics of the multiple images and the particular search criteria, one or more of the multiple images that satisfy the search criteria are identified and displayed or otherwise provided in response to the request.

In accordance with one or more aspects, covariance based characteristics of each of multiple images are determined, and image searches by an image searching system can be based on these covariance based characteristics. The covariance based characteristics of an image identify one or both of a direction and a magnitude, in a color space of the image, of a distribution of color values of pixels of the image. The covariance based characteristics of the multiple images are stored so that the covariance based characteristics of each of the multiple images is accessible to the image searching system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Covariance based color characteristics of images are discussed herein. Each of multiple images is analyzed to determine the covariance of the image, which is an indication of how the colors of the pixels of the image are distributed throughout the color space of the image. Different covariance based characteristics of the image are determined that identify a direction, as well as magnitude in each direction, of the distribution of colors of the pixels of the image. These different covariance based characteristics that are determined for an image can be saved as associated with the image, allowing the characteristics to be accessed and used as a basis for searching the images to identify particular types of images. Various different types of images can be searched for, such as grayscale images, sepia images, high contrast or low contrast images, low or high color images, and so forth. These different covariance based characteristics can also be used to order the images identified by a search, such as ordering images based on how close to being fully grayscale the images are, based on the extent of the color space that is used by the image, and so forth.

Figure 1:
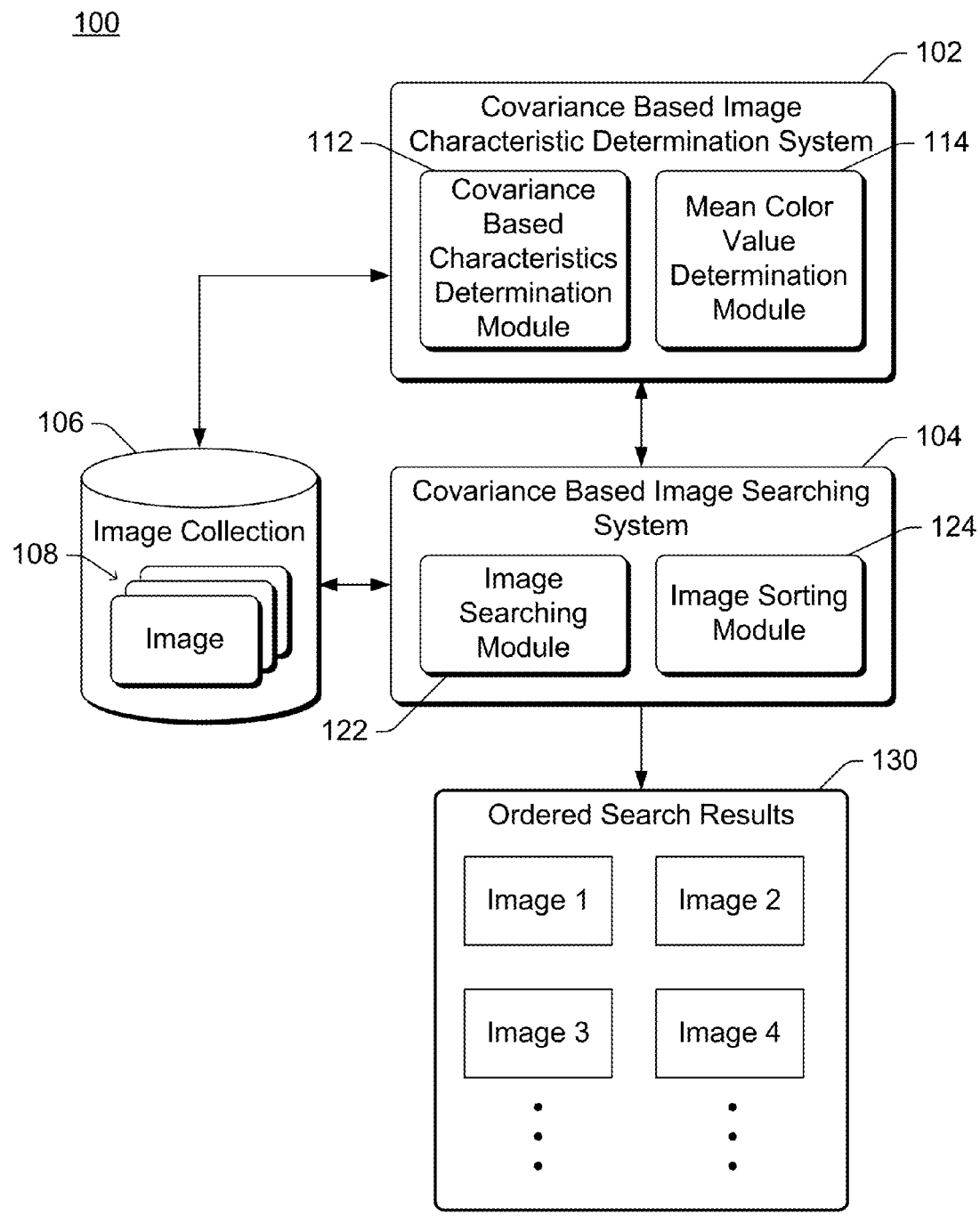
FIG. 1 illustrates an example environment in which the covariance based color characteristics of images can be used in accordance with one or more embodiments.

FIG. 1 illustrates an example environment 100 in which the covariance based color characteristics of images can be used in accordance with one or more embodiments. Environment 100 includes a covariance based image characteristic determination system 102, a covariance based image searching system 104, and an image collection 106. Image collection 106 includes multiple images 108 that can be stored at a variety of different sources. For example, images 108 can be stored at a publicly accessible database, at a private storage service, on a computing device or other image capture device of a user, and so forth.

Covariance based image characteristic determination system 102 includes a covariance based characteristics determination module 112 that determines covariance based characteristics of each image 108, and a mean color value determination module 114 that determines mean color values for each image 108. The covariance based characteristics of an image refer to one or more directions of the distribution of color values of pixels of the image in a color space of the image, as well as a magnitude of the distribution of color values in each of the one or more directions. As part of the covariance based characteristics of an image, a color rank of the image can be determined. The color rank of an image identifies a number of dimensions in the distribution of color values of pixels in the image, also referred to as the dimensionality of a color space of the image.

The mean color values for an image refer to the mean or average color values of pixels of the image for each of one or more elements in the color space of the image (also referred to as components of the color space). For example, in the RGB (red, green, blue) color space, the mean color values for the image refer to the mean or average color of the red element of pixels in the image, the mean or average color of the green element of pixels in the image, and the mean or average of the blue element of pixels in the image.

Covariance based image searching system 104 includes an image searching module 122 and an image sorting module 124. Image searching module 122 receives a request (e.g., from a user or another module) to search images 108 to identify a particular type of images, such as grayscale images, high or low contrast images, high or low color images, and so forth. Module 122 uses the determined covariance based characteristics and/or mean color value of images 108 to identify one or more of images 108 that are of the identified type. Image sorting module 124 uses the determined covariance based characteristics and/or mean color value of images 108 to place the one or more images identified by image searching module 122 into a particular order. The one or more images identified by image searching module 122 in the order determined by image sorting module 124 are provided as ordered search results 130. Ordered search results can be provided by system 104 in a variety of different manners, such as displayed or otherwise presented to a user of system 104, communicated to another device or system, stored in a data store for subsequent retrieval, and so forth.

Image characteristic determination system 102 can optionally return the determined characteristics and mean color value to the source of an image 108, which in turn can store the determined characteristics and mean color value as associated with the image. The determined characteristics and mean color value can be stored as associated with the image in various manners, such as storing the determined characteristics and mean color value as metadata associated with the image, embedding the determined characteristics and mean color value in a header or other portion of a data structure including the data of the image, storing the determined characteristics and mean color value in a database or other record associated with the image, and so forth. Alternatively, image characteristic determination system 102 can provide the determined characteristics and mean color value to image searching system 104 as images 108 are being searched. Thus, rather than having the determined characteristics and mean color values all determined prior to searching images 108, the covariance based characteristics and mean color value for one or more images 108 can be determined as system 104 is searching images 108.

It should be noted that system 102, system 104, and/or image collection 106 can be implemented on the same device or multiple devices. For example, covariance based image characteristic determination system 102 and covariance based image searching system 104 can be implemented on one device (e.g., a server computer or a user's laptop computer) and image collection 106 can be implemented on another device. By way of another example, each of covariance based image characteristic determination system 102, covariance based image searching system 104, and image collection 106 can be implemented on a separate one or more devices (e.g., separate server computers).

Figure 2:
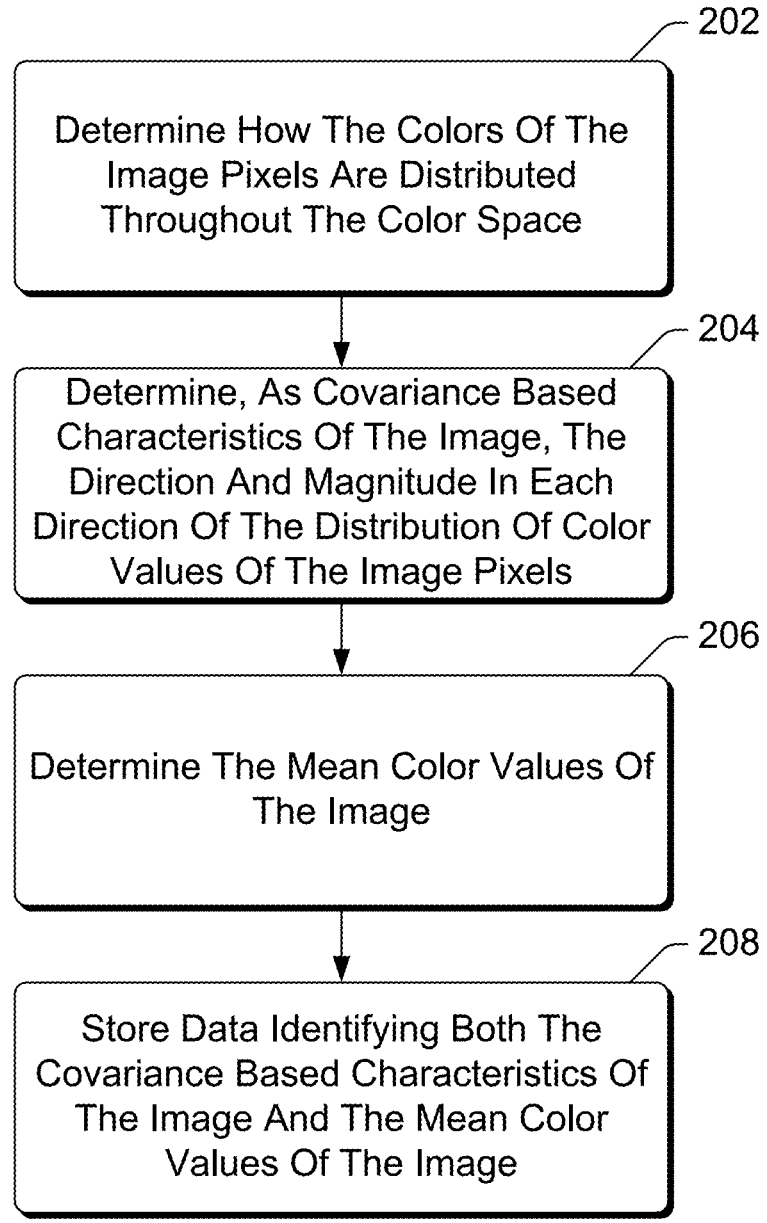
FIG. 2 is a flowchart illustrating an example process for determining characteristics of an image in accordance with one or more embodiments.

FIG. 2 is a flowchart illustrating an example process 200 for determining characteristics of an image in accordance with one or more embodiments. Process 200 is carried out by a system, such as covariance based image characteristic determination system 102 of FIG. 1, and can be implemented in software, firmware, hardware, or combinations thereof. Process 200 is shown as a set of acts and is not limited to the order shown for performing the operations of the various acts. Process 200 is an example process for determining characteristics of an image; additional discussions of determining characteristics of an image are included herein with reference to different figures.

In process 200, a determination is made as to how the colors of the pixels of the image are distributed throughout the color space (act 202). The colors of the pixels of the image can be represented using various different color spaces, such as the RGB color space. Although the techniques discussed herein are discussed with reference to the RGB color space, other color spaces can alternatively be used. For example, the HSV (hue, saturation, value) or YUV (luma and chrominance) color spaces can be used.

Figure 3:
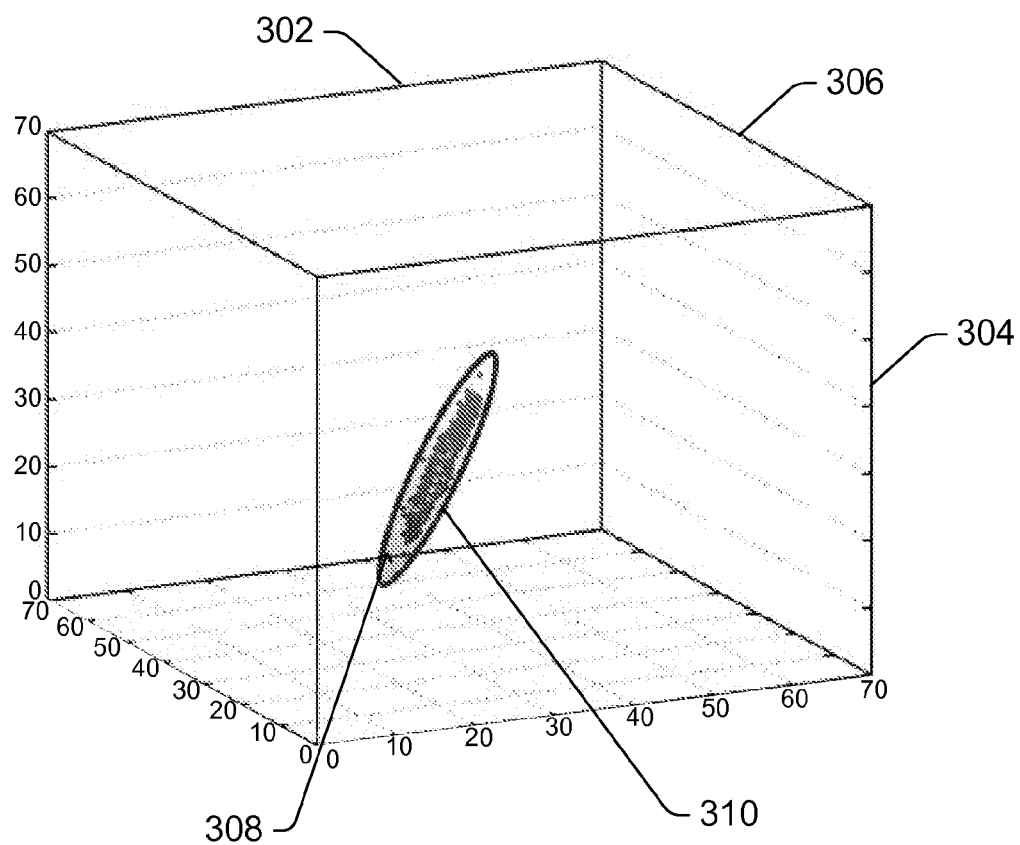
FIG. 3 illustrates an example distribution of colors throughout a color space in accordance with one or more embodiments.

FIG. 3 illustrates an example distribution of colors throughout a color space 300 in accordance with one or more embodiments. The color space 300 is the RGB color space and is illustrated as a cube, with a red element along an axis 302, a green element along an axis 304, and a blue element along an axis 306. The color value of each pixel in the image is illustrated as one dot of dots 308 in color space 300.

Returning to FIG. 2, one or more directions of distribution of color values of image pixels in a color space of the image, as well as a magnitude of the distribution of color values in each of the one or more directions, are determined as covariance based characteristics of the image (act 204). The directions and magnitude in each direction of the distribution of the colors refers to a geometric shape of an ellipse or ellipsoid in the color space that includes at least a threshold amount (e.g., a majority) of the image pixels. An example of the directions and magnitude in each direction of the distribution of the colors of the image pixels is illustrated as an ellipse 310 of FIG. 3. The axes of ellipse 310 identify the two directions of the distribution of the colors of image pixels in color space 300, and the distance along an axis between vertices of the ellipse (the locations where the axes intersect the ellipse) identifies the magnitude of the distribution of color values in the direction of that axis.

Returning to FIG. 2, the mean color values of the image are determined (act 206). The mean color values of the image are the average or mean color values for each element of the color space. For example, an image in the RGB color space has three elements (red, green, blue) and thus three mean color values (a mean color value of the red elements of the image pixels, a mean color value of the green elements of the image pixels, and a mean color value of the blue elements of the image pixels).

Data identifying the covariance based characteristics of the image as well as the mean color values of the image is stored (act 208). The data identifying the covariance based characteristics and mean color values of the image can be stored as associated with the image in various manners as discussed above.

Figure 4:
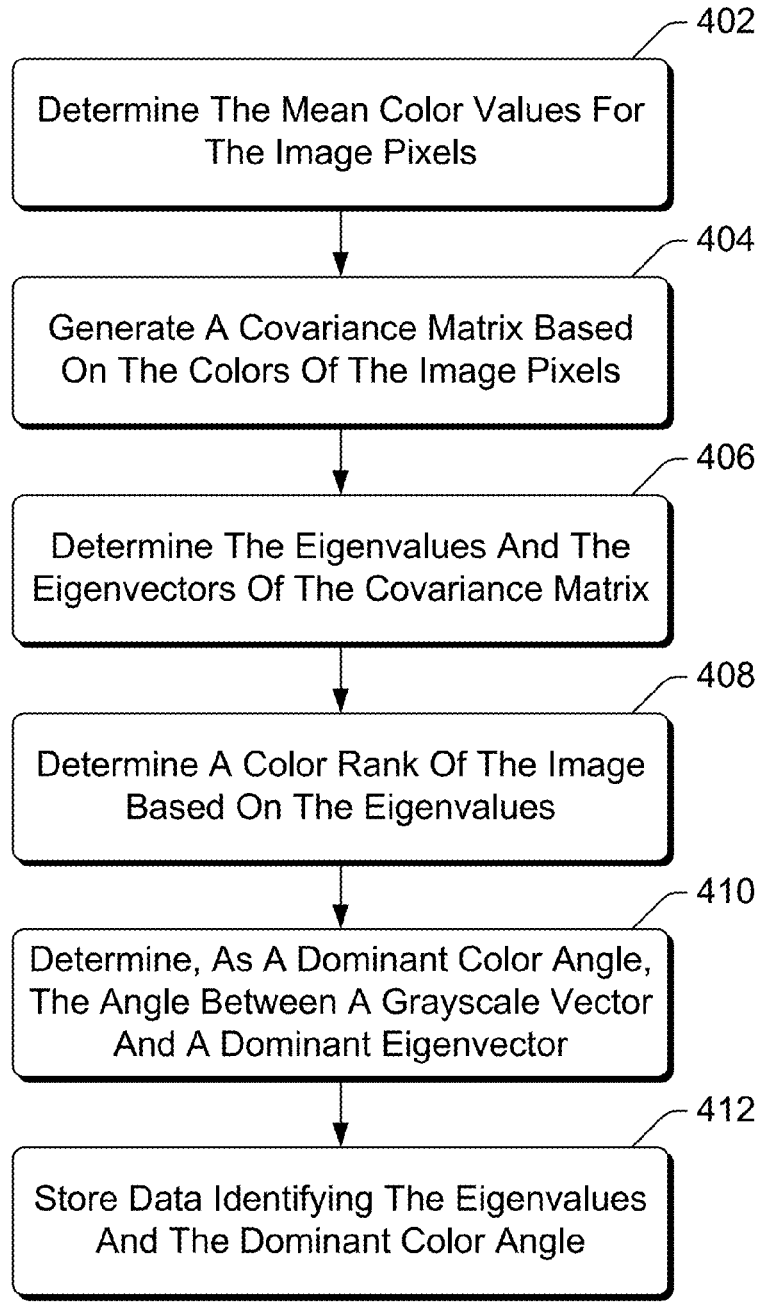
FIG. 4 is a flowchart illustrating an example process for determining characteristics of an image in accordance with one or more embodiments.

FIG. 4 is a flowchart illustrating an example process 400 for determining characteristics of an image in accordance with one or more embodiments. Process 400 is carried out by a system, such as covariance based image characteristic determination system 102 of FIG. 1, and can be implemented in software, firmware, hardware, or combinations thereof. The characteristics of the image include covariance based characteristics and optionally additional characteristics (e.g., mean color values of image pixels). Process 400 is shown as a set of acts and is not limited to the order shown for performing the operations of the various acts. Process 400 is an example process for determining characteristics of an image; additional discussions of determining characteristics of an image are included herein with reference to different figures.

In process 400, the mean pixel color values for the image pixels are determined (act 402). Three mean pixel color values are determined, one for each element in the color space. For example, in the RGB color space, a mean value of the R element of the pixels in the image is determined, a mean value of the G element of the pixels in the image is determined, and a mean value of the B element of the pixels in the image is determined.

A covariance matrix based on the colors of the image pixels is also generated (act 404). The covariance matrix indicates how the colors of pixels in the image are spread out or distributed in the RGB color space. The covariance matrix can be generated in any of a variety of conventional manners based on the colors of the image pixels. For a three element color space such as RGB, the covariance matrix is a 3×3 matrix.

The eigenvalues and the eigenvectors of the covariance matrix are determined (act 406). For a 3×3 covariance matrix, three eigenvalues and three eigenvectors are determined. The eigenvectors indicate the directions of the axes of an ellipse or ellipsoid that includes at least a threshold amount (e.g., a majority) of the image pixels, and each eigenvector corresponds to an eigenvalue. Each eigenvector refers to a direction of distribution of color values of pixels of the image in the RGB color space. The magnitude of an eigenvalue indicates the magnitude or extent of the color space used by the pixels of the image in the direction of the corresponding eigenvector. The magnitude of the largest eigenvalue also indicates the extent of the color space used by the image. The eigenvalues and eigenvectors can be determined in any of a variety of conventional manners, such as using singular value decomposition. However, other techniques can alternatively be used to determine the eigenvalues and eigenvectors, such as principal component analysis.

A color rank of the image is determined based on the eigenvalues of the covariance matrix (act 408). The color rank of the image refers to a number of dimensions in the distribution of the colors of the pixels in the image, which is also the number of dimensions in the ellipse or ellipsoid indicated by the eigenvectors determined in act 404. The color rank indicates a number of independent colors that are in the image (e.g., zero, one, two, or three for a three element color space).

In one or more embodiments, the color rank of the image is determined as being a number of eigenvalues of the covariance matrix that are greater than a threshold value. This threshold value is typically a small value, such as 0.0001 in situations where the RGB component values are scaled to the range zero to one. As there are three eigenvalues for the covariance matrix, the color rank can be zero, one, two, or three.

The angle between a grayscale vector and a dominant eigenvector, referred to as the dominant color angle, is also determined (act 410). The grayscale vector refers to a vector indicating grayscale color in the color space, such as a vector (1,1,1) in the RGB color space. The dominant eigenvector refers to the eigenvector that corresponds to the largest eigenvalue (the eigenvalue with the greatest magnitude) determined in act 406. The dominant color angle is the angle difference between the dominant eigenvector and the grayscale vector.

Data identifying the eigenvalues and the dominant color angle are stored (act 412). This data can be stored as associated with the image in various manners as discussed above. In one or more embodiments, the dominant color angle and one or more of the eigenvalues are the stored data. Alternatively, the stored data can be other data from which the eigenvalues and/or the dominant color angle can be generated.

Various additional data can also be stored in act 412. For example, one or more of the mean pixel color values, or data from which one or more of the mean pixel color values can be generated, can be stored in act 412. By way of example, one or more of the eigenvectors, or data from which one or more of the eigenvectors can be generated, can be stored in act 412. By way of yet another example, the color rank, or data from which the color rank can be generated, can be stored in act 412.

In the following discussion, reference is made to various example threshold values. These example threshold values refer to situations in which the values of elements of the color space (e.g., the RGB component values) are scaled to the range zero to one. It should be noted that other example threshold values can be used, including different example threshold values in situations in which the elements of the color space are scaled to different ranges.

As discussed above, a color rank of the image is determined in act 408. A color rank of zero indicates an image of uniform color. For an image with a color rank of zero, no eigenvalues of the covariance matrix for the image are greater than a threshold value (e.g., 0.0001).

Figure 5:
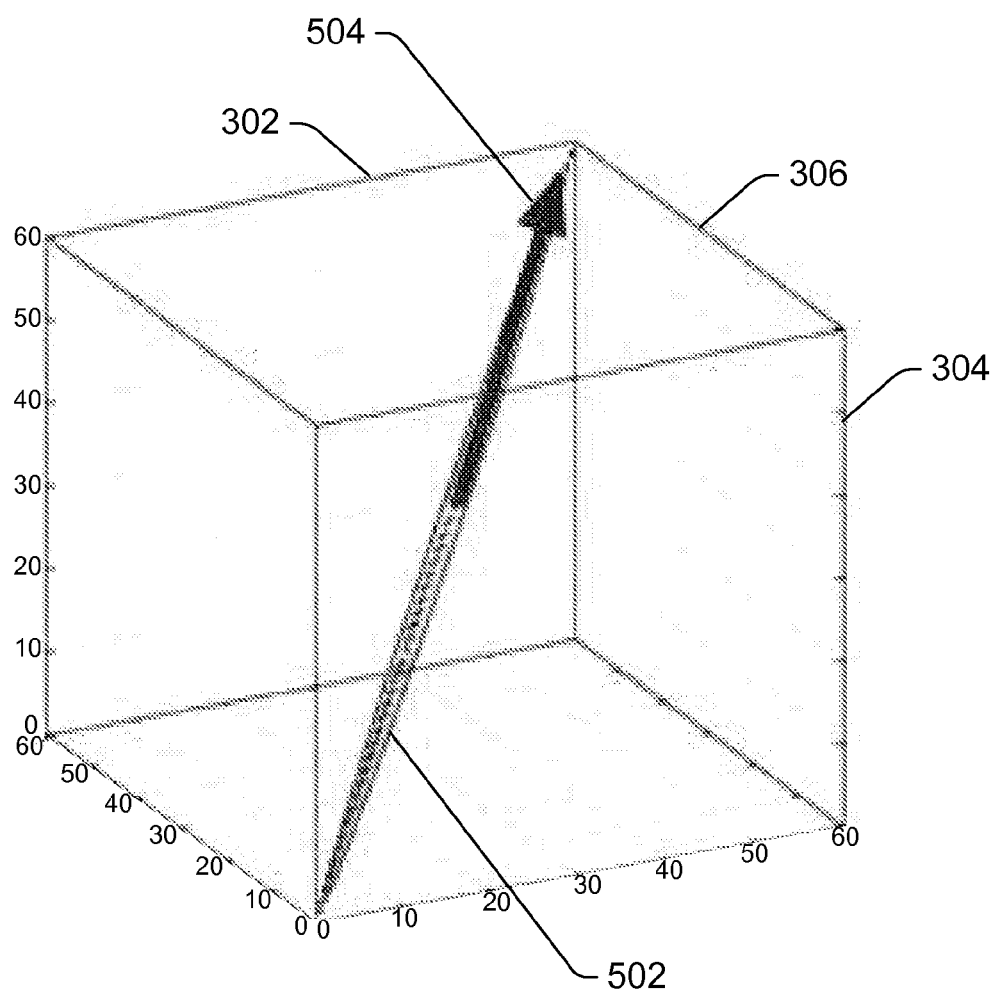
FIG. 5 illustrates an example distribution of colors throughout a color space for a monochromatic image in accordance with one or more embodiments.

A color rank of one indicates a monochromatic image. For an image with a color rank of one, only one eigenvalue of the covariance matrix for the image is greater than a threshold value (e.g., 0.0001), and the eigenvector corresponding to that one eigenvalue is the dominant eigenvector. FIG. 5 illustrates an example distribution of colors throughout a color space 300 for a monochromatic image in accordance with one or more embodiments. The color space 300 is illustrated as a cube as discussed above with reference to FIG. 3, with a red element along an axis 302, a green element along an axis 304, and a blue element along an axis 306. The color value of each pixel in the image is illustrated as a dot in the ellipse 502. Arrow 504 illustrates the direction of the dominant eigenvector.

Grayscale images are a particular case of monochromatic images in which the dominant color angle is less than a threshold amount (e.g., 5 degrees) and the mean pixel color values are grayscale. The mean pixel color values are grayscale if the difference between the maximum of the three mean pixel color values and the minimum of the three mean pixel color values is less than a threshold amount (e.g., 0.001 or 0.01).

Monotone coloring (e.g., sepia) is another particular case of monochromatic images in which the dominant color angle is less than a threshold amount (e.g., 10 degrees), but is not less than the threshold amount for grayscale images (e.g., 5 degrees).

Figure 6:
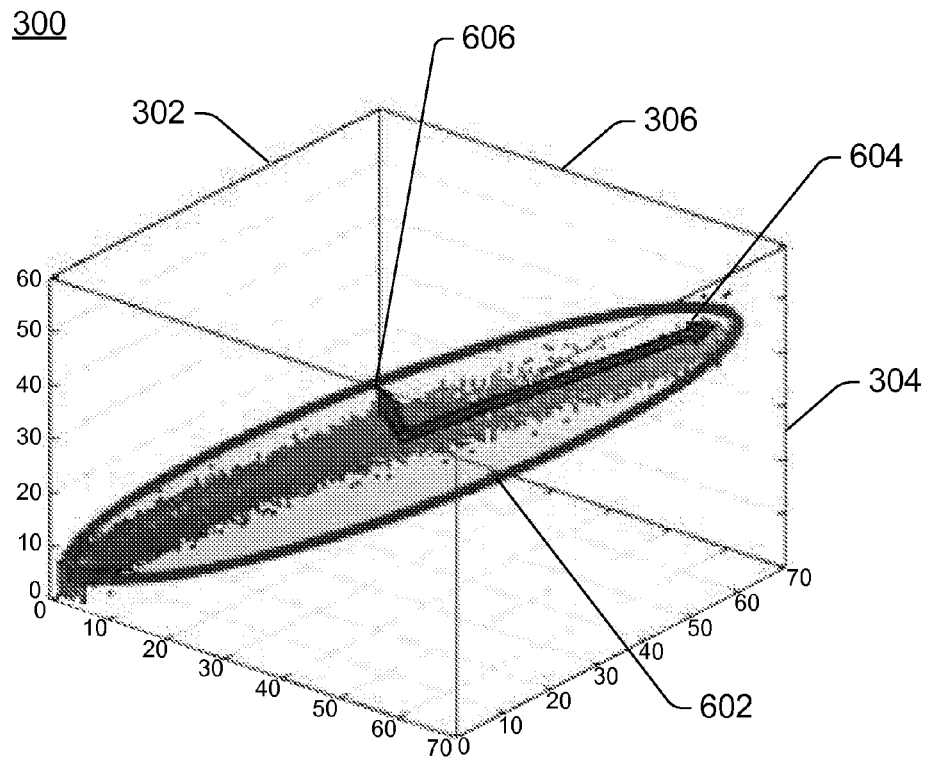
FIGS. 6 and 7 each illustrate an example distribution of colors throughout a color space for a duochromatic image in accordance with one or more embodiments.
Figure 7:
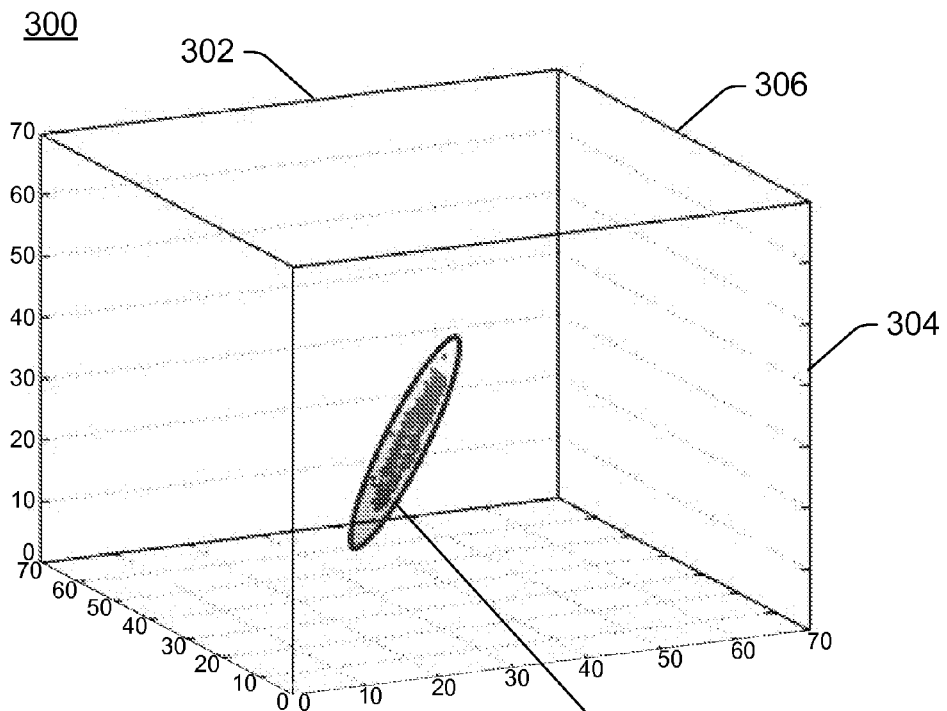

A color rank of two indicates a duochromatic or duotone image. For an image with a color rank of two, only two of the eigenvalues of the covariance matrix for the image are greater than a threshold value (e.g., 0.0001). FIGS. 6 and 7 each illustrate an example distribution of colors throughout a color space 300 for a duochromatic image in accordance with one or more embodiments. The color space 300 is illustrated as a cube as discussed above with reference to FIG. 3. The color value of each pixel in an example image is illustrated as a dot in the ellipse 602 of FIG. 6, which is a 2-dimensional (flat) ellipse. Arrow 604 illustrates the direction of the dominant eigenvector, and arrow 606 illustrates the direction of the eigenvector corresponding to the eigenvalue having the second largest value. The color value of each pixel in another example image is illustrated as a dot in the ellipse 702 of FIG. 7, which is a 2-dimensional (flat) ellipse.

Figure 8:
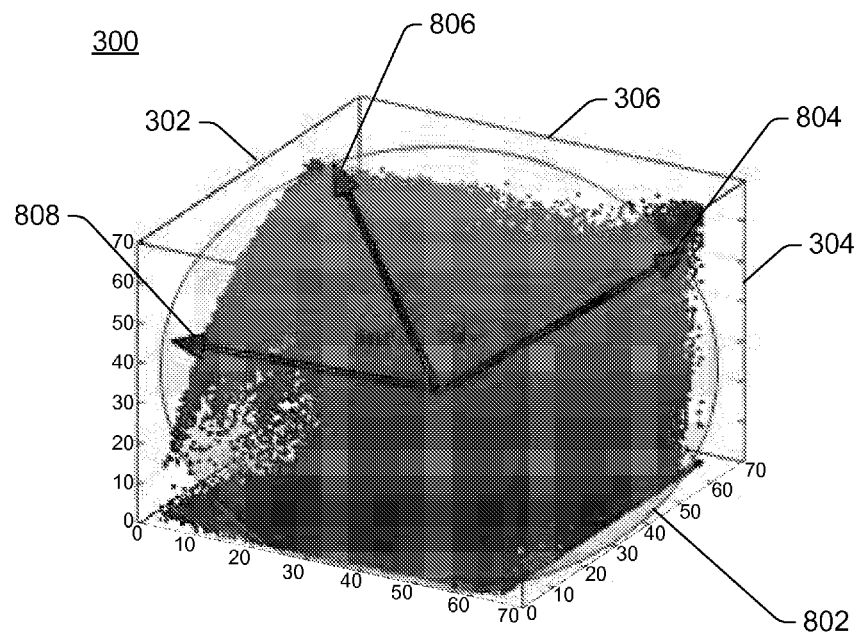
FIGS. 8 and 9 each illustrate an example distribution of colors throughout a color space for a full color image in accordance with one or more embodiments.
Figure 9:
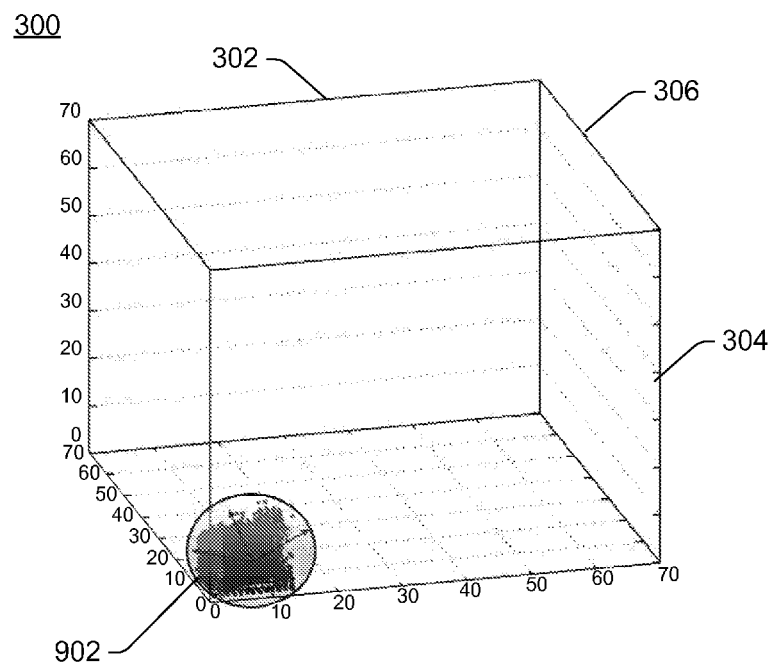

A color rank of three indicates a full color image. For an image with a color rank of three, all three of the eigenvalues of the covariance matrix for the image are greater than a threshold value (e.g., 0.0001). FIGS. 8 and 9 each illustrate an example distribution of colors throughout a color space 300 for a full color image in accordance with one or more embodiments. The color space 300 is illustrated as a cube as discussed above with reference to FIG. 3. The color value of each pixel in an example image is illustrated as a dot in the ellipse 802 of FIG. 8, which is a 3-dimensional ellipsoid. Arrow 804 illustrates the direction of the dominant eigenvector, arrow 806 illustrates the direction of the eigenvector corresponding to the eigenvalue having the second largest value, and arrow 808 illustrates the direction of the eigenvector corresponding to the eigenvalue having the smallest value. The color value of each pixel in another example image is illustrated as a dot in the ellipse 902 of FIG. 9, which is a 3-dimensional ellipsoid.

As discussed above, the magnitude of the largest eigenvalue indicates the extent of the color space used by the image. Images that use a large amount of the color space (e.g., greater than a particular threshold amount) are referred to as high contrast images, and images that use a small amount of the color space (e.g., less than a particular threshold amount) are referred to as low contrast images. This is also reflected in the distribution of colors throughout the color space. Thus, for example, an image having the color values of pixels as illustrated in FIG. 8 is a higher contrast image than the example image having the color values of pixels as illustrated in FIG. 9.

It should be noted that in the discussions herein, the color space used is discussed as including three elements (e.g., red, green, and blue). However, color spaces with more than three elements can be used, such as the CMYK (cyan, magenta, yellow, and key) color space. The techniques discussed herein can be applied to color spaces with more than three elements in a variety of different manners. In one or more embodiments, the color space is converted to a three element color space (e.g., the RGB color space) and the covariance based characteristics are determined as discussed above based on the three element color space.

Alternatively, the techniques discussed herein can be applied analogously to color spaces with more than three elements. Generally, for an n element color space, with n being any integer, the mean color values for each of the n elements of the color space can be determined. Additionally, an n×n covariance matrix can be generated for an n element color space, along with n eigenvalues and n eigenvectors for the covariance matrix. For example, for a four element color space, such as the CMYK color space, the mean color values for each of the four elements of the color space can be determined. Additionally, a 4×4 covariance matrix can be generated for a four element color space, along with four eigenvalues and four eigenvectors for the covariance matrix.

Returning to FIG. 1, covariance based image searching system 104 receives a request to search images 108 for particular types of images, and these particular types of images are searched for based on particular search criteria. System 104 uses the determined data identifying the covariance based characteristics of the images 108 and/or mean color value of images 108 to identify one or more of images 108 that satisfy the search criteria. The determined characteristics and/or mean color value of images 108 are also used to place the one or more images that satisfy the search criteria into a particular order, and provide those images as ordered search results 130.

Figure 10:
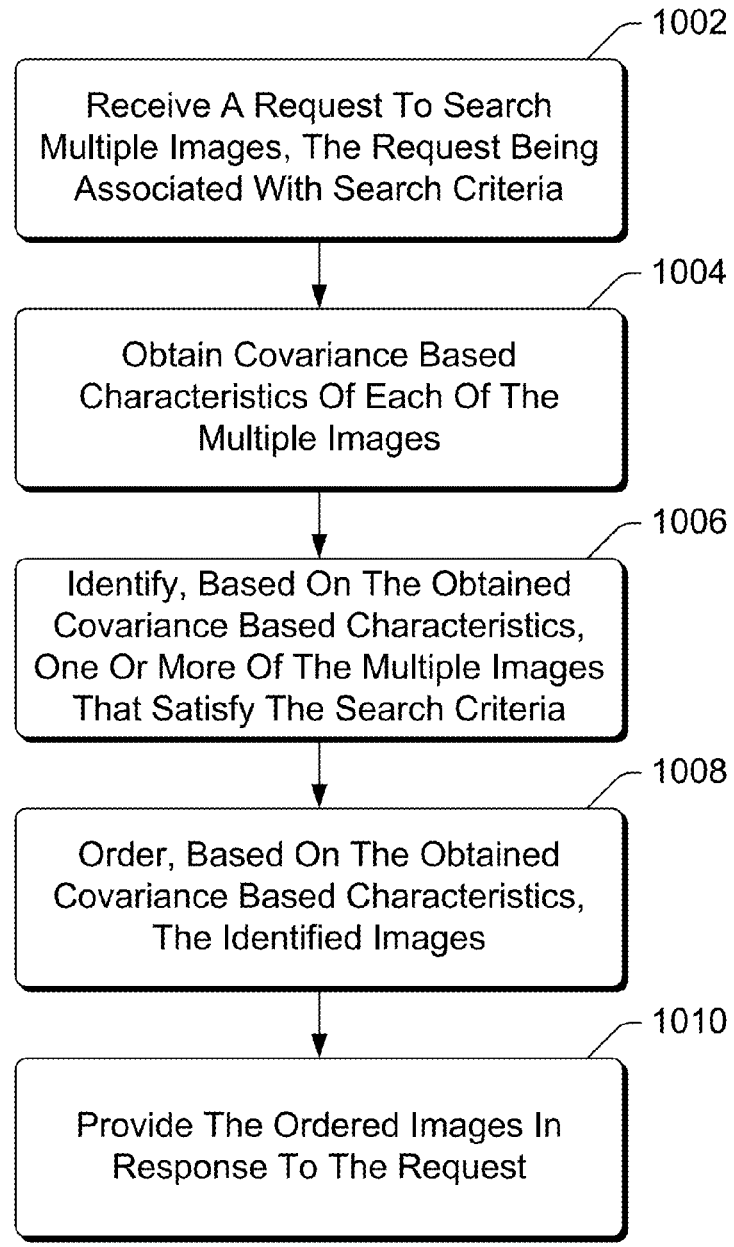
FIG. 10 is a flowchart illustrating an example process for searching images in accordance with one or more embodiments.

FIG. 10 is a flowchart illustrating an example process 1000 for searching images in accordance with one or more embodiments. Process 1000 is carried out by a system, such as covariance based image searching system 104 of FIG. 1, and can be implemented in software, firmware, hardware, or combinations thereof. Process 1000 is shown as a set of acts and is not limited to the order shown for performing the operations of the various acts. Process 1000 is an example process for searching images; additional discussions of searching images are included herein with reference to different figures.

In process 1000, a request to search multiple images is received (act 1002). The request is a request to search for particular types of images, such as grayscale images, sepia images, low contrast images, high contrast images, low color images, medium color images, or high color images. Different types of images have different associated search criteria, and the request for a particular type of images is associated with those search criteria. The search criteria associated with a particular type of images is maintained by, for example, covariance base images searching system 104 of FIG. 1.

The covariance based characteristics of each of the multiple images are obtained (act 1004). The covariance based characteristics of the multiple images are the characteristics of the images determined as discussed above (e.g., by covariance based image characteristic determination system 102 of FIG. 1). The obtained covariance based characteristics can be characteristics that are previously generated and obtained by being retrieved, or can be generated in response to the request received in act 1002.

Based on the obtained covariance based characteristics, one or more of the multiple images that satisfy the search criteria are identified (act 1006). The different search criteria associated with different types of images are discussed in more detail below.

Additionally, based on the obtained covariance based characteristics, the identified images are ordered (act 1008). The ordering can be based on the same or different ones of the covariance based characteristics than are used to identify the images in act 1006.

The ordered images are provided in response to the request (act 1010). The ordered images can be displayed to a user in response to the request, or alternatively provided in other manners (e.g., stored to a record or database, displayed on another device or system, and so forth).

It should be noted that the acts of process 1000 can be performed by one or more devices or services. For example, acts 1002-1010 can all be performed on the same device. By way of another example, a database of images may be maintained by a service (e.g., one or more server computers). A computing device of the user may receive the request in act 1002 and forward an indication of the request to search for particular types of images to the service. The service can perform acts 1004, 1006, and 1008, returning the ordered images to the computing device of the user, which can display the ordered images. Alternatively, the service can perform acts 1004 and 1006, returning a set of images to the computing device of the user, which then orders and provides the ordered images in acts 1008 and 1010.

In one or more embodiments, the search criteria are based on one or more of the following: Eigenvalue1, Eigenvalue2, Eigenvalue3, Dominant Color Angle, and Mean Value. Eigenvalue1 refers to the eigenvalue of an image that has the largest magnitude, Eigenvalue2 refers to the eigenvalue of the image that has the second largest magnitude, and Eigenvalue3 refers to the eigenvalue of the image that has the smallest magnitude. Dominant Color Angle refers to the dominant color angle for the image—the angle difference between the dominant eigenvector and the grayscale vector as discussed above. Mean Value refers to the difference between the maximum of the three mean pixel color values of the image and the minimum of the three mean pixel color values of the image.

For grayscale images, the search criteria include Eigenvalue1, Eigenvalue2, Mean Value, and Dominant Color Angle. An image satisfies the search criteria for grayscale images if: Eigenvalue1 of the image is greater than a particular threshold amount (e.g., 0.0001), Eigenvalue2 of the image is less than a particular threshold amount (e.g., 0.0001), Mean Value of the image is less than a particular threshold amount (e.g., 0.001 or 0.01), and Dominant Color Angle of the image is less than a particular threshold amount (e.g., 5). Images that satisfy the search criteria are ordered in ascending order by Dominant Color Angle, so that images are ordered based on how close to being fully grayscale images they are (e.g., with images that are closer to being fully grayscale being ordered before images that are not as close to being fully grayscale).

Alternatively, the search criteria need not include Eigenvalue1 and Mean Value. For example, a test for whether an image is a single color image (e.g., having a color rank of zero), can be performed prior to checking the search criteria, in which case Eigenvalue1 and Mean Value need not be used in the search criteria for grayscale images. However, the search criteria can include Eigenvalue1 to facilitate distinguishing uniform color images from grayscale images.

For sepia images, the search criteria include Eigenvalue1, Eigenvalue2, and Dominant Color Angle. An image satisfies the search criteria for sepia images if: Eigenvalue1 of the image is greater than a particular threshold amount (e.g., 0.0001), Eigenvalue2 of the image is less than a particular threshold amount (e.g., 0.0002), and Dominant Color Angle of the image is less than a particular threshold amount (e.g., 3). It should be noted that an image that satisfies the search criteria for a grayscale image is deemed to be a grayscale image rather than a sepia image, even if the image does satisfy the search criteria for a sepia image. Thus, for example, a set of sepia images can be obtained by removing from a set of images (or not including in a set of images) those images that satisfy the search criteria for a grayscale image. An image can therefore satisfy the search criteria for sepia images if, for example, Eigenvalue2 of the image is less than a particular threshold amount (e.g., 0.0002) and Dominant Color Angle of the image is less than one particular threshold amount (e.g., 3) and also greater than another particular threshold amount (e.g., 1). By preventing an image having Dominant Color Angle below the lower threshold amount (e.g., 1), images with Dominant Color Angle that are too close (e.g., approximately parallel to) the grayscale vector do not satisfy the search criteria.

Images that satisfy the search criteria are ordered in descending order by Dominant Color Angle, so that images are ordered based on how close to being fully grayscale images they are (e.g., with images that are not as close to being fully grayscale being ordered before images that are closer to being fully grayscale).

Alternatively, the search criteria need not include Eigenvalue1. For example, a test for whether an image is a single color image (e.g., having a color rank of zero), can be performed prior to checking the search criteria, in which case Eigenvalue1 need not be used in the search criteria for sepia images.

For low contrast images, the search criteria includes Eigenvalue1. An image satisfies the search criteria for low contrast images if Eigenvalue1 of the image is less than a particular threshold amount (e.g., 0.045). Images that satisfy the search criteria are ordered in ascending order by the sum of Eigenvalue1, Eigenvalue2, and Eigenevalue3, so that images are ordered based on the extent of the color space that is used by the image (e.g., with images that use less of the color space being ordered before images that use more of the color space).

For high contrast images, the search criteria includes Eigenvalue1. An image satisfies the search criteria for low contrast images if Eigenvalue1 of the image is greater than a particular threshold amount (e.g., 0.3). Images that satisfy the search criteria are ordered in descending order by the sum of Eigenvalue1, Eigenvalue2, and Eigenevalue3, so that images are ordered based on the extent of the color space that is used by the image (e.g., with images that use more of the color space being ordered before images that use less of the color space).

For low color images, the search criteria includes Eigenvalue2. An image satisfies the search criteria for low color images if Eigenvalue2 of the image is less than a particular threshold amount (e.g., 0.0025). Images that satisfy the search criteria are ordered in ascending order by Eigenvalue2 so that images are ordered based on the extent of the second most dominant color (element of the color space) used by the image (e.g., with images that use less of the second most dominant color being ordered before images that use more of the second most dominant color).

For medium color images, the search criteria includes Eigenvalue2 and Eigenvalue3. An image satisfies the search criteria for medium color images if: Eigenvalue2 of the image is greater than or equal to a particular threshold amount (e.g., 0.0025) and Eigenvalue3 of the image is less than a particular threshold amount (e.g., 0.0025). Images that satisfy the search criteria are ordered in ascending order by Eigenvalue1 so that images are ordered based on the extent of the most dominant color (element of the color space) used by the image (e.g., with images that use less of the most dominant color being ordered before images that use more of the most dominant color).

For high color images, the search criteria includes Eigenvalue2 and Eigenvalue3. An image satisfies the search criteria for high color images if: Eigenvalue2 of the image is greater than or equal to a particular threshold amount (e.g., 0.0025) and Eigenvalue3 of the image is greater than or equal to a particular threshold amount (e.g., 0.0025). Images that satisfy the search criteria are ordered in descending order by Eigenvalue3 so that images are ordered based on the extent of the least dominant color (element of the color space) used by the image (e.g., with images that use more of the least dominant color being ordered before images that use less of the least dominant color).

For the search criteria discussed herein, various different threshold amounts are discussed. It is to be appreciated that these threshold amounts are examples, and that other threshold amounts can alternatively be used. These threshold amounts can be determined in different manners, such as empirically.

Furthermore, although examples of identifying images that satisfy the search criteria by comparing particular values of the images (e.g., Eigenvalue1, Eigenvalue2, Mean Value, Dominant Color Angle) to particular threshold amounts are discussed above, alternatively one or more of the multiple images that satisfy the search criteria can be identified in other manners. In one or more embodiments, the covariance based characteristics of the multiple images are used to rank the multiple images, and the one or more images that satisfy the criteria are identified in act 1006 by selecting a particular number of highest (or lowest) ranked images. For example, the multiple images can be ranked by their Eigenvalue2 values (with higher ranked images having the same or smaller Eigenvalue2 values than lower ranked images), and for grayscale or low color images a particular number (e.g., 10 or 20) of the highest ranked images can be identified in act 1006 as the images that satisfy the search criteria. By way of another example, the multiple images can be ranked by their Eigenvalue1 values (with higher ranked images having the same or smaller Eigenvalue1 values than lower ranked images), and for low contrast images a particular number (e.g., 10 or 20) of the highest ranked images can be identified in act 1006 as the images that satisfy the criteria.

It should be noted that in such embodiments, the ordering of the identified images may be inherent in their rankings, and thus the ordering in act 1008 is inherently performed as part of the identification. For example, if the images are ordered in ascending order by Eigenvalue2, and the images were identified as the images being the highest ranked images as ranked by their Eigenvalue2 values, then the ordering of the images is inherent in the rankings of the identified images.

In the discussions herein, the covariance based color characteristics of images techniques are discussed with reference to searching and ordering images. However, it should be noted that the covariance based color characteristics of images techniques discussed herein can alternatively be used for other purposes. For example, the covariance based color characteristics of images techniques can be used to identify characteristics of images prior to printing and the printing of the images can be altered based on the characteristics, such as to use only particular colors (e.g., ink or toner) or specialized colors (e.g., ink or toner). By way of another example, the covariance based color characteristics of images techniques can be used for color balancing, such as altering the manner in which images are displayed based on their characteristics.

Although particular functionality is discussed herein with reference to particular modules, it should be noted that the functionality of individual modules discussed herein can be separated into multiple modules, and/or at least some functionality of multiple modules can be combined into a single module. Furthermore, it should be noted that a particular module discussed herein as performing an action includes that particular module itself performing the action, or alternatively that particular module invoking or otherwise accessing another component or module that performs the action (or performs the action in conjunction with that particular module).

Figure 11:
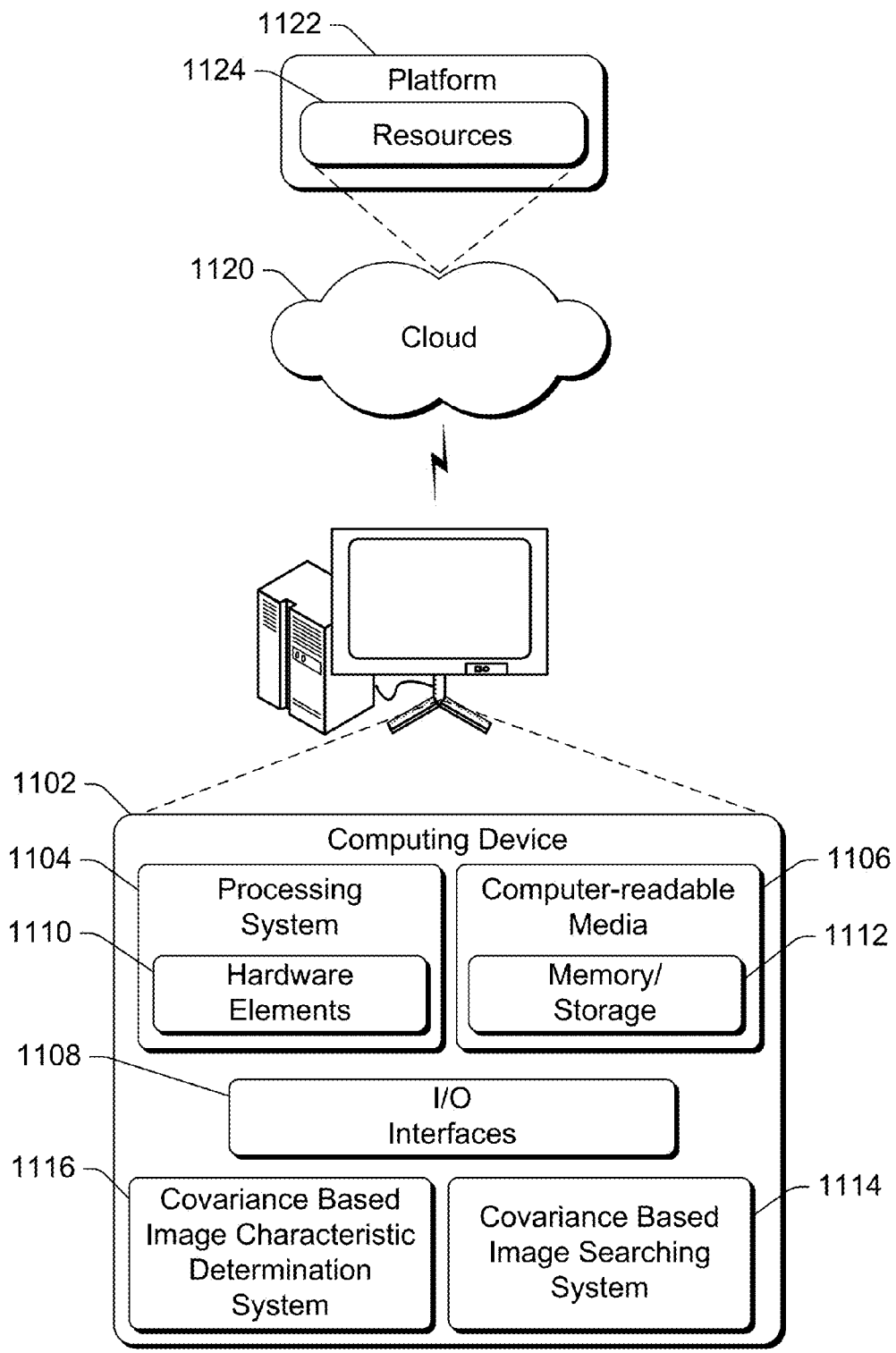
FIG. 11 illustrates an example system that includes an example computing device that is representative of one or more computing systems and/or devices that may implement the various techniques described herein.

FIG. 11 illustrates an example system generally at 1100 that includes an example computing device 1102 that is representative of one or more computing systems and/or devices that may implement the various techniques described herein. This is illustrated through inclusion of the covariance based image characteristic determination system 1116, which may be configured to determine covariance based characteristics of images as discussed above. Computing device 1102 is also illustrated as including a covariance based image searching system 1114, which may be configured to search for images based on the covariance based characteristics of images as discussed above. Although computing device 1102 is illustrated as including both covariance based image characteristic determination system 1116 and covariance based image searching system 1114, it should be noted that computing device 1102 may alternatively include only one of system 1114 and system 1116. Computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 1104 is representative of functionality to perform one or more operations using hardware. Accordingly, processing system 1104 is illustrated as including hardware elements 1110 that may be configured as processors, functional blocks, and so forth. This may include implementation in hardware as an application specific integrated circuit or other logic device formed using one or more semiconductors. Hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 1106 is illustrated as including memory/storage 1112. Memory/storage 1112 represents memory/storage capacity associated with one or more computer-readable media. Memory/storage component 1112 may include volatile media (such as random access memory (RAM)) and/or nonvolatile media (such as read only memory (ROM), Flash memory, optical disks, magnetic disks, and so forth). Memory/storage component 1112 may include fixed media (e.g., RAM, ROM, a fixed hard drive, and so on) as well as removable media (e.g., Flash memory, a removable hard drive, an optical disc, and so forth). Computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. Computing device 1102 may be configured to implement particular instructions and/or functions corresponding to the software and/or hardware modules. Accordingly, implementation of a module that is executable by computing device 1102 as software may be achieved at least partially in hardware, e.g., through use of computer-readable storage media and/or hardware elements 1110 of processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of computing device 1102 and are not limited to the specific examples of the techniques described herein. This functionality may also be implemented all or in part through use of a distributed system, such as over a "cloud" 1120 via a platform 1122 as described below.

Cloud 1120 includes and/or is representative of a platform 1122 for resources 1124. Platform 1122 abstracts underlying functionality of hardware (e.g., servers) and software resources of cloud 1120. Resources 1124 may include applications and/or data that can be utilized while computer processing is executed on servers that are remote from computing device 1102. Resources 1124 can also include services provided over the Internet and/or through a subscriber network, such as a cellular or Wi-Fi network.

Platform 1122 may abstract resources and functions to connect computing device 1102 with other computing devices. Platform 1122 may also serve to abstract scaling of resources to provide a corresponding level of scale to encountered demand for resources 1124 that are implemented via platform 1122. Accordingly, in an interconnected device embodiment, implementation of functionality described herein may be distributed throughout system 1100. For example, the functionality may be implemented in part on computing device 1102 as well as via platform 1122 that abstracts the functionality of the cloud 1120.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving a request to search multiple images, the request being associated with particular search criteria;
   obtaining covariance based characteristics of each of the multiple images, the covariance based characteristics of an image identifying one or both of a direction and a magnitude, in a color space of the image, of a distribution of color values of pixels of the image;
   identifying, based on both the covariance based characteristics of the multiple images and the particular search criteria, one or more of the multiple images that satisfy the search criteria; and
   providing, in response to the request, the one or more of the multiple images.

2. A method as recited in claim 1, further comprising ordering the one or more of the multiple images in accordance with the covariance based characteristics.

3. A method as recited in claim 1, the obtaining the covariance based characteristics comprising retrieving the covariance based characteristics stored as associated with the image.

4. A method as recited in claim 1, the obtaining the covariance based characteristics comprises generating, for at least one of the multiple images, the covariance based characteristics in response to the request.

5. A method as recited in claim 1, further comprising:
obtaining, for each of the multiple images, mean color values for the image that identify the mean color values for pixels of the image in each element of the color space; and
the identifying comprising identifying, based on the covariance based characteristics of the multiple images as well as the mean color values for the images and the particular search criteria, one or more of the multiple images that satisfy the search criteria.

6. A method as recited in claim 1, the obtaining comprising obtaining, as covariance based characteristics identifying the magnitude of the distribution of color values of pixels of the image, one or more eigenvalues of a covariance matrix that indicates how the colors of pixels in the image are spread out in the color space.

7. A method as recited in claim 1, the obtaining further comprising obtaining, as covariance based characteristics of the image, a dominant color angle of the image, the dominant color angle comprising an angle between a grayscale vector in the color space and a dominant eigenvector of the image, the dominant eigenvector of the image comprising an eigenvector of a covariance matrix that indicates how the colors of pixels in the image are spread out in the color space, the dominant eigenvector corresponding to a largest of multiple eigenvalues of the covariance matrix.

8. A method as recited in claim 7, the receiving the request comprising receiving a request to search for grayscale images, the request being associated with search criteria indicating:
one of the multiple eigenvalues being less than a first threshold amount, the one eigenvalue comprising the one of the multiple eigenvalues having a second largest magnitude; and
the dominant color angle being less than a second threshold amount.

9. A method as recited in claim 7, the receiving the request comprising receiving a request to search for sepia images, the request being associated with search criteria indicating:
one of the multiple eigenvalues being less than a first threshold amount, the one eigenvalue comprising the one of the multiple eigenvalues having a second largest magnitude, the first threshold amount being greater than a second threshold amount included as search criteria for the one eigenvalue associated with requests to search for grayscale images; and
the dominant color angle being less than a third threshold amount, the third threshold amount being less than a fourth threshold amount included as search criteria for the dominant color angle associated with requests to search for grayscale images.

10. A method as recited in claim 1, the receiving the request comprising receiving a request to search for low contrast images, the request being associated with search criteria indicating one of multiple eigenvalues of a covariance matrix that indicates how the colors of pixels in the image are spread out in the color space being less than a first threshold amount, the one eigenvalue being the one of the multiple eigenvalues having the largest magnitude.

11. A method as recited in claim 1, the receiving the request comprising receiving a request to search for high contrast images, the request being associated with search criteria indicating one of multiple eigenvalues of a covariance matrix that indicates how the colors of pixels in the image are spread out in the color space being greater than a first threshold amount, the one eigenvalue being the one of the multiple eigenvalues having the largest magnitude, the first threshold amount being greater than a second threshold amount included as search criteria for the one eigenvalue associated with requests to search for low contrast images.

12. A method as recited in claim 1, the receiving the request comprising receiving a request to search for low color images, the request being associated with search criteria indicating one of multiple eigenvalues of a covariance matrix that indicates how the colors of pixels in the image are spread out in the color space being less than a first threshold amount, the one eigenvalue being the one of the multiple eigenvalues having a second largest magnitude.

13. A method as recited in claim 1, the receiving the request comprising receiving a request to search for medium color images, the request being associated with search criteria indicating:
a first eigenvalue of multiple eigenvalues of a covariance matrix that indicates how the colors of pixels in the image are spread out in the color space being at least a first threshold amount, the first eigenvalue being the one of the multiple eigenvalues having a second largest magnitude; and
a second eigenvalue of the multiple eigenvalues being less than a second threshold amount, the second eigenvalue being the one of the multiple eigenvalues having a smallest magnitude.

14. A method as recited in claim 1, the receiving the request comprising receiving a request to search for high color images, the request being associated with search criteria indicating:
a first eigenvalue of multiple eigenvalues of a covariance matrix that indicates how the colors of pixels in the image are spread out in the color space being at least a first threshold amount, the first eigenvalue being the one of the multiple eigenvalues having a second largest magnitude; and
a second eigenvalue of the multiple eigenvalues being at least a second threshold amount, the second eigenvalue being the one of the multiple eigenvalues having a smallest magnitude.

15. A method comprising:
determining, for each of multiple images, covariance based characteristics of the image upon which image searches by an image searching system can be based, the covariance based characteristics of the image identifying one or both of a direction and a magnitude, in a color space of the image, of a distribution of color values of pixels of the image; and
storing the covariance based characteristics of the multiple images so that the covariance based characteristics of each of the multiple images is accessible to the image searching system.

16. A method as recited in claim 15, further comprising:
determining, for each of the multiple images, mean color values for the image that identify the mean color values for pixels of the image in each element of the color space; and
the storing comprising storing both the covariance based characteristics and the mean color values so that both the covariance based characteristics and the mean color values of each of the multiple images are accessible to the image searching system.

17. A method as recited in claim 16, the storing comprising storing both the covariance based characteristics and the mean color values for an image as associated with the image.

18. A method as recited in claim 15, the determining comprising determining, as the covariance based characteristics identifying one or both of the direction and the magnitude of the distribution of color values of pixels of the image, one or more eigenvalues of a covariance matrix that indicates how the colors of pixels in the image are spread out in the color space.

19. A method as recited in claim 18, the determining further comprising determining, as covariance based characteristics of the image, a dominant color angle of the image, the dominant color angle comprising an angle between a grayscale vector in the color space and a dominant eigenvector of the image, the dominant eigenvector of the image comprising an eigenvector of the covariance matrix, the dominant eigenvector corresponding to a largest of multiple eigenvalues of the covariance matrix.

20. A device comprising:
   a memory to store covariance based characteristics of each of multiple images, the covariance based characteristics of an image identifying a magnitude, in each of one or more directions in a color space of the image, of a distribution of color values of pixels of the image; and
   a processing system to implement a covariance based image searching system configured to:
      obtain, in response to a search request associated with search criteria, the covariance based characteristics of each of the multiple images;
      use the covariance based characteristics of the multiple images to identify one or more of the multiple images that satisfy the search criteria; and
      provide, in response to the search request, the identified one or more images.

21. A device as recited in claim 20, the covariance based image searching system being further configured to order the identified one or more images in accordance with the covariance based characteristics of the identified one or more images.

22. A device as recited in claim 20, wherein to obtain the covariance based characteristics is to retrieve the covariance based characteristics stored as associated with the image.

23. A device as recited in claim 20, the covariance based image searching system being further configured to obtain, as covariance based characteristics of an image, one or more eigenvalues of a covariance matrix that indicates how the colors of pixels in the image are spread out in the color space.

24. A device as recited in claim 23, the covariance based image searching system being further configured to obtain, as covariance based characteristics of an image, a dominant color angle of the image, the dominant color angle comprising an angle between a grayscale vector in the color space and a dominant eigenvector of the image, the dominant eigenvector of the image comprising an eigenvector of the covariance matrix, the dominant eigenvector corresponding to a largest of multiple eigenvalues of the covariance matrix.

* * * * *